(12) United States Patent
Watkins et al.

(10) Patent No.: US 8,274,592 B2
(45) Date of Patent: Sep. 25, 2012

(54) VARIABLE RATE BROWSING OF AN IMAGE COLLECTION

(75) Inventors: Christopher Watkins, Penfield, NY (US); Timothy J. White, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 301 days.

(21) Appl. No.: 12/644,448

(22) Filed: Dec. 22, 2009

(65) Prior Publication Data

US 2011/0149138 A1 Jun. 23, 2011

(51) Int. Cl.
*H04N 5/222* (2006.01)
*G06F 3/041* (2006.01)

(52) U.S. Cl. .................... 348/333.02; 345/173

(58) Field of Classification Search .................. None
See application file for complete search history.

(56) References Cited

U.S. PATENT DOCUMENTS

| | | | |
|---|---|---|---|
| 6,919,927 B1 * | 7/2005 | Hyodo | 348/333.02 |
| 7,065,387 B2 * | 6/2006 | Engstrom | 455/566 |
| 7,092,024 B2 * | 8/2006 | Kawamura et al. | 348/333.12 |
| 7,345,675 B1 | 3/2008 | Minakuchi et al. | |
| 7,355,620 B2 | 4/2008 | Ikehata et al. | |
| 7,430,008 B2 | 9/2008 | Ambiru et al. | |
| 7,479,949 B2 | 1/2009 | Jobs et al. | |
| 2002/0176016 A1 | 11/2002 | Misawa et al. | |
| 2002/0186251 A1 | 12/2002 | Himmel et al. | |
| 2006/0033721 A1 | 2/2006 | Woolley et al. | |
| 2007/0260994 A1 | 11/2007 | Sciammarella et al. | |
| 2008/0163119 A1 | 7/2008 | Kim et al. | |
| 2008/0165141 A1 | 7/2008 | Christie | |
| 2008/0165150 A1 | 7/2008 | Kwon | |
| 2008/0297484 A1 | 12/2008 | Park et al. | |
| 2009/0160778 A1 | 6/2009 | Nurmi et al. | |
| 2010/0020222 A1 * | 1/2010 | Jones et al. | 348/333.02 |
| 2010/0269038 A1 * | 10/2010 | Tsuda | 715/702 |

FOREIGN PATENT DOCUMENTS

EP 1 942 403 A2 7/2008
EP 1 947 556 A1 7/2008

* cited by examiner

*Primary Examiner* — Luong T Nguyen
(74) *Attorney, Agent, or Firm* — Kevin E. Spaulding

(57) ABSTRACT

A method for browsing a collection of digital images on a display screen with a touch screen user interface, comprising: forming an ordered sequence of digital images; entering an image review mode and displaying a first digital image from the ordered sequence of digital images on the display screen; initiating a sequential image display process in response to a user touching the touch screen, wherein the sequential image display process sequentially displays digital images in the ordered sequence of digital images on the touch screen until such time that the user stops touching the touch screen, wherein a time interval between the display of sequential images is specified by a scroll rate which is controlled responsive to the position that the user is touching the touch screen.

21 Claims, 6 Drawing Sheets

VARIABLE RATE BROWSING OF AN IMAGE COLLECTION

FIELD OF THE INVENTION

This invention pertains to the field of browsing collections of digital images, and more particularly to a variable scroll rate browsing method where the scroll rate is controlled by a touch position on a touch screen.

BACKGROUND OF THE INVENTION

Digital cameras have become very common and have largely replaced traditional film cameras. Today, most digital cameras incorporate a display screen on the back of the camera to enable image preview and to provide user interface elements for adjusting camera settings. The display screen can also be used to browse through images that have been captured using the digital camera and are stored in the digital camera's memory. To use this capability, the user typically puts the camera into a review mode and uses buttons to scroll through the images one at a time. When a large number of digital images are stored in the digital camera, it can be a time-consuming and frustrating process to scroll through the images to find the ones of interest.

Touch screen displays and other forms of touch-based user interfaces are becoming increasingly common for consumer digital devices such as music players and cell phones and digital cameras. Touch screens provide unique opportunities for system designers to develop new and innovative user interface designs.

U.S. Patent Application Publication 2002/0176016 to Misawa et al., entitled "Portable Electronic Apparatus" discloses a digital camera having touch pads arranged around a display screen, wherein display operations can be controlled in accordance with touch position and movement.

U.S. Patent Application Publication 2008/0165150 to Kwon, entitled "Data Scrolling Apparatus and Method for Mobile Terminal," teaches a digital camera having touch strips positioned on left and right sides of a display screen. Device operations can be controlled by detecting slide operations on the touch strips.

U.S. Pat. No. 7,345,675 to Minakuchi et al., entitled "Apparatus for Manipulating an Object Displayed on a Display Device by Using a Touch Screen," teaches a method for manipulating objects displayed on a display device having a touch screen.

U.S. Pat. No. 7,355,620 to Ikehata et al., entitled "Digital Still Camera and User Instruction Input Method," discloses a digital still camera in which a direction and speed of a tracing operation by user's fingertips on a touch panel are judged and a dynamic image reproduction process is executed in accordance with the direction and speed. For example, a fast forward operation is executed in response to a long and fast tracing operation from left to right and a rewind operation is executed in response to a long and fast tracing operation from right to left.

U.S. Pat. No. 7,430,008 discloses a method for advancing, backing or deleting an image displayed on a touch screen according to a detected touch pattern.

U.S. Pat. No. 7,479,949 to Jobs et al., entitled "Touch Screen Device, Method, and Graphical User Interface for Determining Commands by Applying Heuristics," teaches a method for interacting with a computing device comprising detecting one or more touch positions on a touch screen.

U.S. Patent Application Publication 2008/0163119 to Kim, entitled "Method for Providing Menu and Multimedia Device Using the Same" discloses a multimedia device including a touch screen which can be used to enable a user to interact with menu icons for the purpose of controlling the operation of the device.

U.S. Patent Application Publication 2008/0165141 to Christie, entitled "Gestures for Controlling, Manipulating and Editing of Media Files using Touch Sensitive Devices," discloses a method for using a touch sensitive display to manage and edit media files on a computing device.

U.S. Patent Application Publication 2008/0297484 to Park, entitled "Method and Apparatus for Providing Gesture Information Based on Touchscreen and Information Terminal Device Having the Apparatus," discloses a method for enabling user interface interaction based on a touch screen. The method includes displaying guide information if a touch of the touch screen is sensed.

U.S. Patent Application Publication 2009/0160778 to Nurmi et al., entitled "Apparatus, Method and Computer Program Product for Using Variable Numbers of Tactile Inputs," teaches a method for using varying numbers of tactile inputs to manipulate different features of an electronic device. In particular, varying numbers of tactile inputs can be used to adjust the speed of movement of an image displayed on the electronic device, to modify adjustable features, and to unlock the electronic device.

There remains a need for an efficient and user-friendly method for browsing collections of images on digital imaging devices having a touch screen.

SUMMARY OF THE INVENTION

The present invention represents a method for browsing a collection of digital images on a display screen with a touch screen user interface, comprising:

forming an ordered sequence of digital images;

entering an image review mode and displaying a first digital image from the ordered sequence of digital images on the display screen;

initiating a sequential image display process in response to a user touching the touch screen, wherein the sequential image display process sequentially displays digital images in the ordered sequence of digital images on the touch screen until such time that the user stops touching the touch screen, wherein a time interval between the display of sequential images is specified by a scroll rate which is controlled responsive to the position that the user is touching the touch screen.

This invention has the advantage that it provides a user with a convenient method to control the scroll rate when browsing images on a display device having a touch screen user interface. This approach allows the user to quickly skip over low-interest images and easily slow down to view images that have a higher interest level.

It has the additional advantage that a user can more quickly find a particular image of interest by allowing him to quickly skip to a portion of an image collection that contains the particular image, then to slowly browse through the images near the particular image until it is located.

It has the further advantage that it can be used to control the viewing of digital video files, enabling a user to conveniently fast forward or rewind through a digital video to find a particular video segment of interest.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

Because digital cameras employing imaging devices and related circuitry for signal capture and correction and for exposure control are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
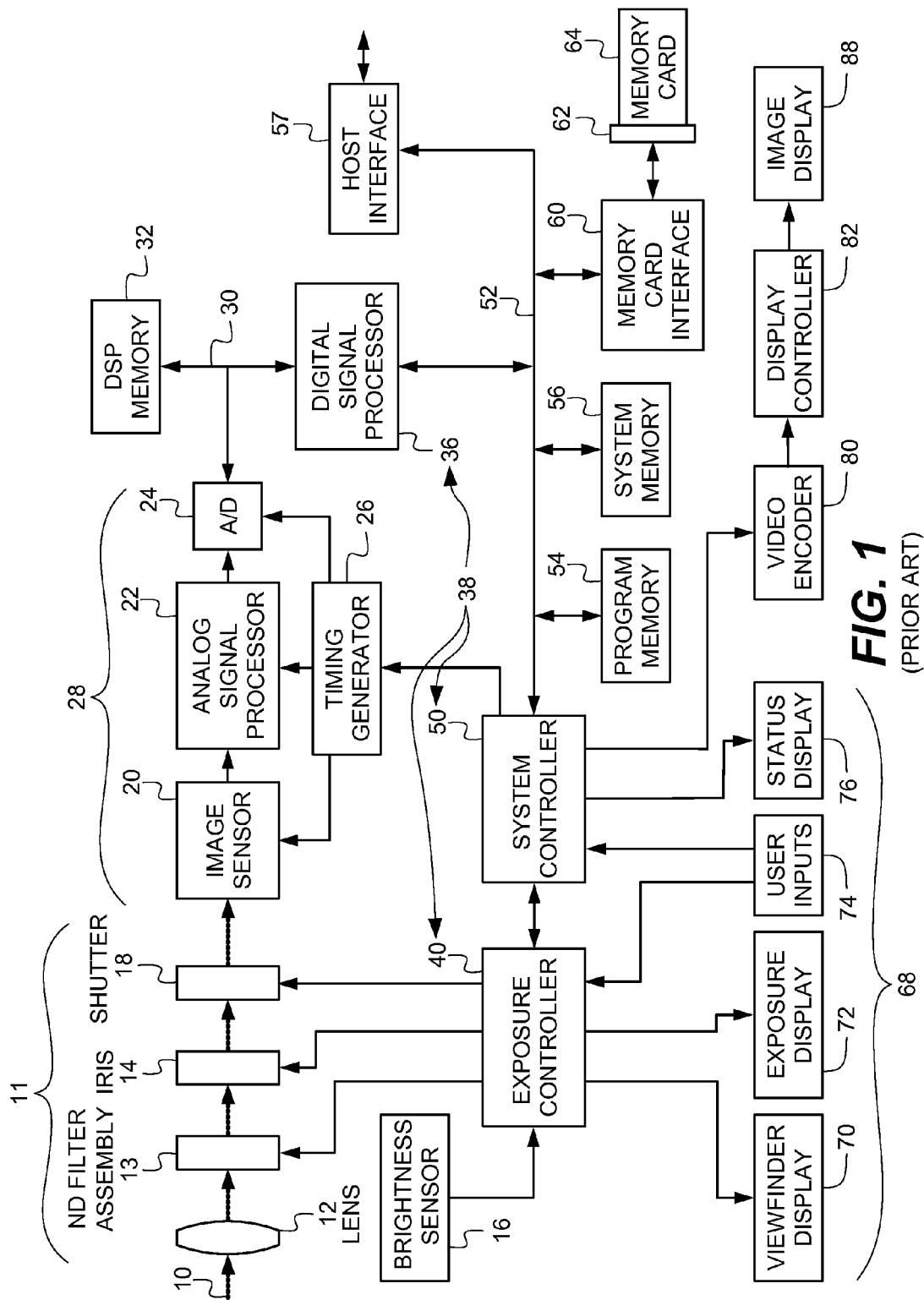
FIG. 1 is a high-level diagram showing the components of a prior art digital camera system.

Turning now to FIG. 1, a block diagram of an digital imaging device embodying the present invention is shown. In this example, the digital imaging device is shown as a digital camera. However, although a digital camera will now be explained, the present invention is clearly applicable to other types of digital imaging devices as well. In the disclosed digital camera, light from the subject scene 10 is input to an imaging stage 11, where the light is focused by lens 12 to form an image on a solid state color filter array image sensor 20. Color filter array image sensor 20 converts the incident light to an electrical signal for each picture element (pixel). The color filter array image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process.) Other types of image sensors having two-dimensional array of pixels can also be used provided that they employ the patterns of the present invention. The color filter array image sensor 20 for use in the present invention comprises a two-dimensional array of color and panchromatic pixels as will become clear later in this specification after FIG. 1 is described.

The amount of light reaching the color filter array image sensor 20 is regulated by an iris block 14 that varies the aperture and a neutral density (ND) filter block 13 that includes one or more ND filters interposed in the optical path. Also regulating the overall light level is the time that a shutter 18 is open. An exposure controller 40 responds to the amount of light available in the scene as metered by a brightness sensor block 16 and controls all three of these regulating functions.

This description of a particular camera configuration will be familiar to one skilled in the art, and it will be obvious that many variations and additional features are present. For example, an autofocus system can be added, or the lens can be detachable and interchangeable. It will be understood that the present invention can be applied to any type of digital camera, where similar functionality is provided by alternative components. For example, the digital camera can be a relatively simple point-and-shoot digital camera, where the shutter 18 is a relatively simple movable blade shutter, or the like, instead of the more complicated focal plane arrangement. The present invention can also be practiced using imaging components included in non-camera devices such as mobile phones and automotive vehicles.

The analog signal from the color filter array image sensor 20 is processed by analog signal processor 22 and applied to analog-to-digital (A/D) converter 24. A timing generator 26 produces various clocking signals to select rows and pixels and synchronizes the operation of analog signal processor 22 and A/D converter 24. An image sensor stage 28 includes the color filter array image sensor 20, the analog signal processor 22, the A/D converter 24, and the timing generator 26. The components of image sensor stage 28 can be separately fabricated integrated circuits, or they can be fabricated as a single integrated circuit as is commonly done with CMOS image sensors. The resulting stream of digital pixel values from the A/D converter 24 is stored in a digital signal processor (DSP) memory 32 associated with a digital signal processor (DSP) 36.

The DSP 36 is one of three processors or controllers in this embodiment, in addition to a system controller 50 and an exposure controller 40. Although this partitioning of camera functional control among multiple controllers and processors is typical, these controllers or processors can be combined in various ways without affecting the functional operation of the camera and the application of the present invention. These controllers or processors can include one or more digital signal processor devices, microcontrollers, programmable logic devices, or other digital logic circuits. Although a combination of such controllers or processors has been described, it should be apparent that one controller or processor can be designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in the DSP memory 32 according to a software program permanently stored in a program memory 54 and copied to DSP memory 32 for execution during image capture. DSP 36 executes the software necessary for practicing image processing shown in FIG. 18. DSP memory 32 can be any type of random access memory, such as SDRAM. The bus 30 including a pathway for address and data signals connects DSP 36 to its related DSP memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter block 13, iris block 14, and shutter 18 as previously described, directing the timing generator 26 to operate the color filter array image sensor 20 and associated elements, and directing DSP 36 to process the captured image data. After an image is captured and processed, the final image file stored in DSP memory 32 is transferred to a host computer via host interface 57, stored on a removable memory card 64 or other storage device, and displayed for the user on an image display 88.

A system controller bus 52 includes a pathway for address, data and control signals, and connects system controller 50 to DSP 36, program memory 54, a system memory 56, host interface 57, a memory card interface 60 and other related devices. Host interface 57 provides a high speed connection to a personal computer (PC) or other host computer for transfer of image data for display, storage, manipulation or printing. This interface can be an IEEE1394 or USB2.0 serial interface or any other suitable digital interface. Memory card 64 is typically a Compact Flash (CF) card inserted into memory card socket 62 and connected to the system controller 50 via memory card interface 60. Other types of storage that can be utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

A user interface 68, including all or any combination of a viewfinder display 70, an exposure display 72, a status display 76, the image display 88, and user inputs 74, is controlled by a combination of software programs executed on exposure controller 40 and system controller 50. User inputs 74 typically include some combination of buttons, rocker switches, joysticks, rotary dials. According to the present invention, the user inputs 74 include at least a display screen with a touch screen user interface. Exposure controller 40 operates light metering, exposure mode, autofocus and other exposure functions. The system controller 50 manages a graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens 12 and shutter 18 accordingly for subsequent captures. The brightness sensor block 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture, the exposure controller 40 automatically increases the exposure time to maintain the same overall exposure.

The foregoing description of a digital camera will be familiar to one skilled in the art. It will be obvious that there are many variations of this embodiment that are possible and are selected to reduce the cost, add features or improve the performance of the camera. The following description will disclose in detail a method for browsing a collection of digital images captured and stored on a camera according to the present invention. Although this description is with reference to a digital camera having a touch screen user interface, it will be understood that the present invention applies to any type of image browsing system that incorporates a display screen with a touch screen user interface. For example, the present invention can be used for a digital picture frame systems, imaging kiosks, handheld consumer electronic devices or cell phones having touch screen displays.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase "digital image" or "digital image file", as used herein, refers to any digital image file, such as a digital still image or a digital video file.

The present invention will now be described with reference to FIG. 2, which illustrates a flow diagram outlining a method for browsing a digital image collection 100 on a device having a display screen with a touch screen user interface according to a preferred embodiment of the present invention. A form ordered sequence step 105 forms an ordered sequence of digital images 110 using images from the digital image collection 100. Next, a user initiates an enter image review mode step 115 for the purpose of reviewing digital images in the ordered sequence of digital images 110. For example, a user can initiate the enter image review mode step 115 by tapping on appropriate user interface button or selecting an option from a user interface menu. When the enter image review mode step 115 is initiated, a first digital image from the ordered sequence of digital images 110 is displayed on the display screen. To scroll through the digital images in the ordered sequence of digital images 110 the user initiates a sequential image display process 125 using an initiate touch and hold step 120. The initiate touch and hold step 120 is triggered by the user touching the display screen, generally using a finger, and maintaining contact with the display screen.

A monitor touch position step 130 is used to determine a touch position 135 that the user is touching the display screen. A calculate scroll rate step 140 is then used to determine a scroll rate 145 responsive to the touch position 135. The sequential image display process 125 sequentially displays the digital images in the ordered sequence of digital images 110, wherein a time interval between the display of sequential images is specified by the scroll rate 145. The sequential image display process 125 will continue to scroll through the ordered sequence of digital images 110 as long as the user maintain contact with the display screen. If the user adjusts the position that he is touching the display screen while the sequential image display process 125 is running, the monitor touch position step 130 will sense a new touch position 135, and the scroll rate 145 will be adjusted accordingly. A terminate touch and hold step 150 is triggered when the user stops touching the display screen. This, in turn, initiates a terminate sequential image display process step 155 which terminates the sequential image display process 125.

The various aspects of the present invention shown in FIG. 2 will now be described in more detail. In a preferred embodiment of the present invention, the display screen with the touch screen user interface is a display screen on a digital camera. In this case, the digital image collection 100 would generally be a set of digital images that were captured using the digital camera and are stored in a memory within the digital camera. The memory can be an internal memory or can be a removable memory module such as an SD card. The digital image collection 100 can include both digital still images, as well as digital videos.

Figure 3A:
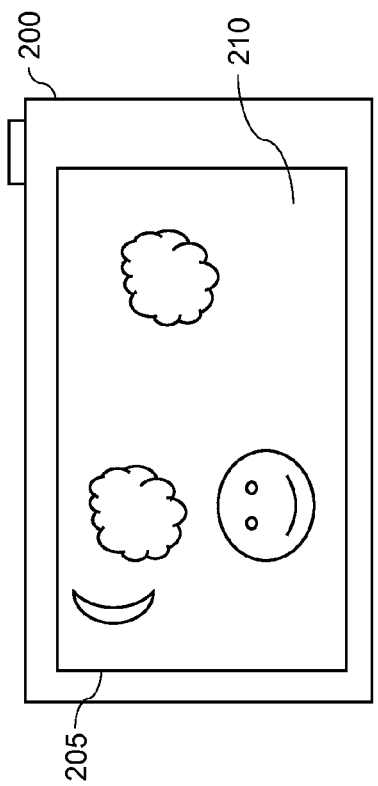
FIG. 3A illustrates a digital camera having a touch screen that can be used in accordance with the present invention.

FIG. 3A shows an example of a digital camera 200 having a touch screen 205. In a preferred embodiment of the present invention, the touch screen 205 is a LCD display screen having a touch sensitive overlay. There are many ways to form touch screen overlays known to those skilled in the art. In one embodiment of the present invention, the touch sensitive overlay uses capacitive touch screen technology. Other types of touch screens that can be used in accordance with the present invention include those that use resistive technology, infrared technology or surface acoustic wave technology.

In an alternate embodiment of the present invention the display screen with the touch screen user interface is a display screen on a digital picture frame. In this case, the digital image collection 100 (FIG. 2) would generally be stored in a memory within the digital picture frame, or a memory accessible by the digital picture frame over a network interface such as Ethernet or a Wi-Fi wireless network interface. In other embodiments, the display screen with the touch screen user interface can be a component of other types of digital imaging systems such as imaging kiosks, handheld consumer electronic devices or cell phones. In each case, the digital image collection 100 would be stored in a memory accessible by the digital imaging system.

Figure 2:
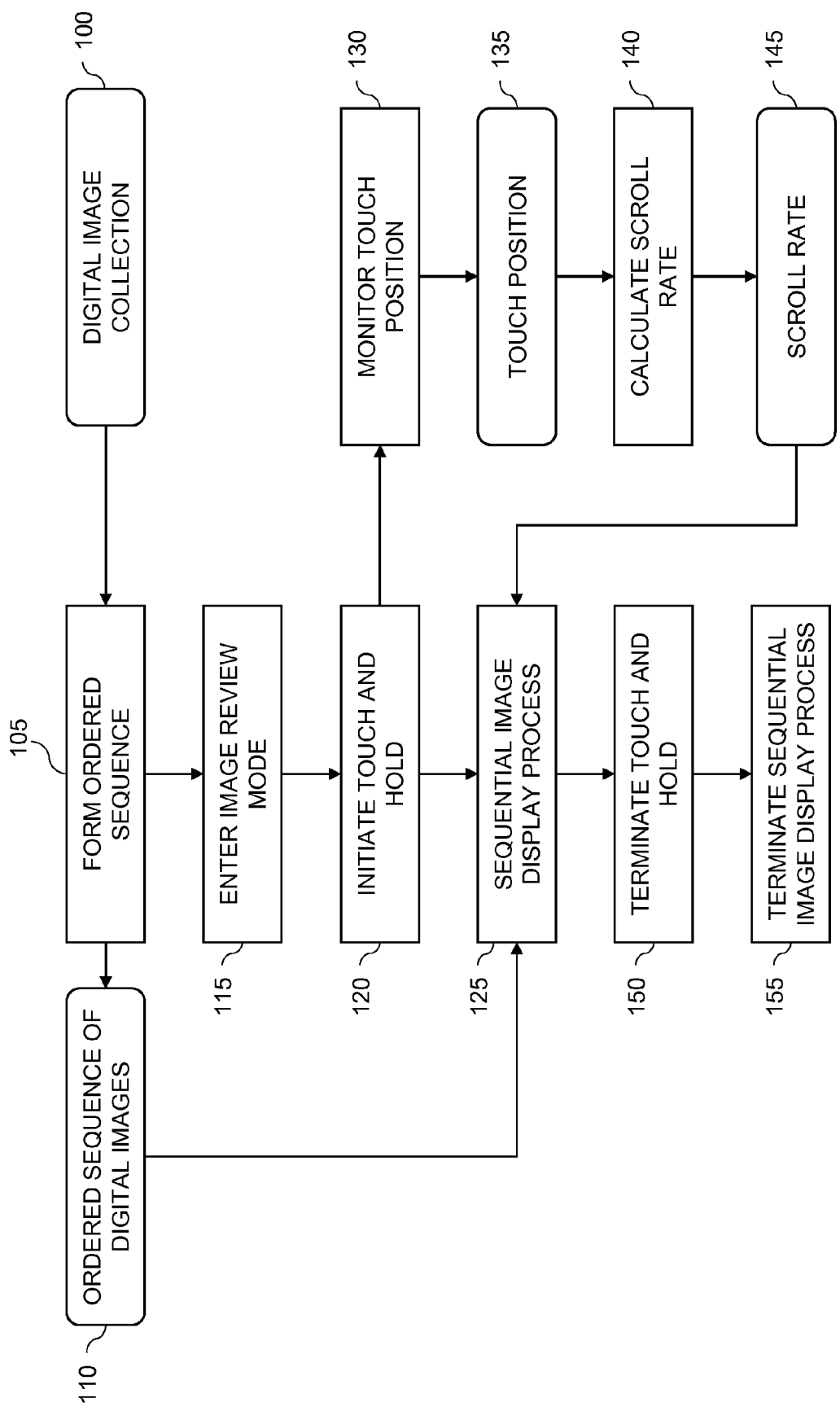
FIG. 2 is a flow diagram outlining a method for browsing a digital image collection according to a preferred embodiment of the present invention.

Returning to a discussion of FIG. 2, the form ordered sequence step 105 can work in a variety of different ways. For example, for the case where the present invention is practiced as part of a digital camera user interface, the ordered sequence of digital images 110 can contain all of the digital images stored in the digital camera's memory. In this case, the form ordered sequence step 105 can, for example, order all of the digital images according to the order that they were captured. Digital cameras generally name digital images using a sequential file name system, so the ordered sequence of digital images 110 can be formed by simply sorting the filenames into ascending order. Alternately, capture date and time metadata stored in the digital image files can be used to sort the digital images. The order in which the images are placed within the ordered sequence of digital images 110 can also be determined using other methods. For example, a user can manually specify an order or can sort the images according to some other attribute such as file size, file type or subject.

In some cases, it may be desirable to form an ordered sequence of digital images 110 that contains only a subset of the digital image collection 100. For example, the ordered sequence of digital images 110 can contain only images that the user has tagged to be favorites, or images that were captured on a specific date, or images that have been determined to contain a particular individual using a face detection algorithm. It will be obvious to one skilled in the art that there are many other ways that a subset of the digital images in the digital image collection 100 could be selected and ordered to form an ordered sequence of digital images in accordance with the present invention.

In an alternate embodiment of the present invention, the ordered sequence of digital images 110 corresponds to the frames of a digital video. In this case, each frame of the digital video can be treated as an individual digital image in the ordered sequence of digital images 110. The feature of adjusting the scroll rate 145 in response to the touch position 135 can then be used to control the playback speed and direction of the digital video.

The enter image review mode step 115 results in displaying a first digital image 210 (FIG. 3A) from the ordered sequence of digital images 110 on the touch screen 205 (FIG. 3A). The particular image from the ordered sequence of digital images 110 that is used as the first digital image 210 can be selected in a variety of ways. In a preferred embodiment of the present invention, when the user enters the image review mode, the most recently captured digital image is used as the first digital image 210. In an alternate embodiment of the present invention, the first digital image 210 can be selected by displaying the ordered sequence of digital images 110 in a thumbnail display and having the user interactively select one of the images, for example by tapping on the image.

Figure 3B:
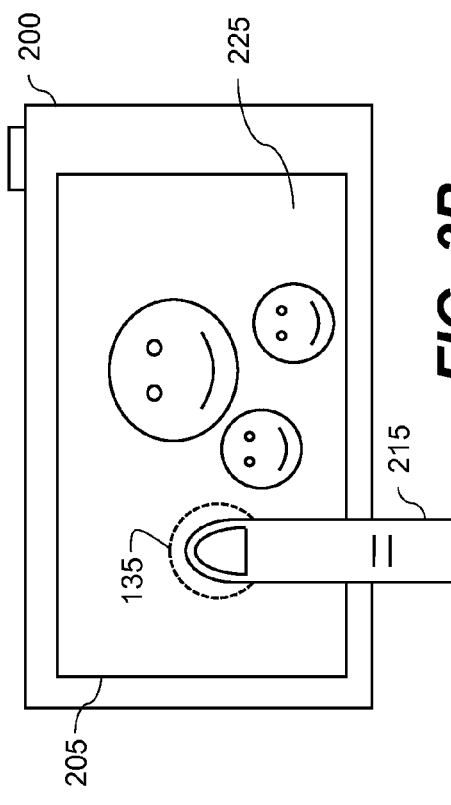
FIG. 3B illustrates a digital camera being used to browse digital images according to the method of the present invention.

The sequential image display process 125 is initiated by the initiate touch and hold step 120 when the user touches the touch screen 205 and maintains contact with it. For example, FIG. 3B shows a finger 215 contacting the touch screen 205 at a touch position 135. The sequential image display process 125 (FIG. 2) updates a displayed digital image 225 by sequentially displaying digital images from the ordered sequence of digital images 110 (FIG. 2) until such time that the user stops touching the touch screen 205. In a preferred embodiment of the present invention the touch position 135 where the user touches the touch screen 205 is within the area used to display the displayed digital image 225.

However, in alternate embodiments, the touch position 135 can be within other regions of the display screen. For example, a rectangular region can be defined along one edge of the touch screen 205 that can be used to control the sequential image display process 120.

The transition from one displayed digital image 225 to the next can be accomplished using any method known to one skilled in the art. For example, an "appear" mode can be used where the next image simply replaces the previous image. Alternately, other modes such as a "wipe" mode, a "page turn" mode, a "dissolve" mode, or a "fly in" mode can be used. These options and many other transition modes will be well-known to one skilled in the art. In one embodiment of the present invention, the user can select a preferred transition mode from a menu of available options.

As the sequential image display process 125 scrolls through the ordered sequence of digital images 110, the first or last digital image in the sequence may be reached. In a preferred embodiment of the present invention, a wrap-around behavior is used where the sequential display of images picks up at the other end of the ordered sequence of digital images 110. For example, if the sequential image display process 125 is proceeding in a forward direction through the ordered sequence of digital images 110 and reaches the last digital in the ordered sequence of digital images 110, the next image that would be displayed would be the first digital image in the ordered sequence of digital images 110. Similarly, if the sequential image display process 125 is proceeding in a backward direction through the ordered sequence of digital images 110 and reaches the first digital in the ordered sequence of digital images 110, the next image that would be displayed would be the last digital image in the ordered sequence of digital images 110. Alternately, the sequential image display process 125 can be configured to stop when it reaches first or last image in the ordered sequence. This behavior would generally be desired when the ordered sequence of digital images 110 corresponds to the frames of a digital video. In one embodiment of the present invention, the user can specify a preferred wrap-around behavior from a menu of available options.

Figure 3C:
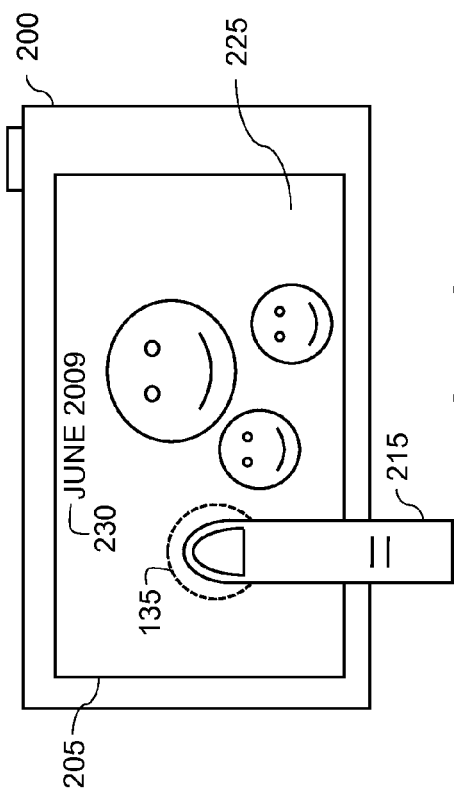
FIG. 3C illustrates a displayed digital image having overlay date text.

In one embodiment of the present invention, overlay text is added to the displayed digital image 225 during the sequential image display process 125. FIG. 3C shows an example where overlay date text 230 is added to the displayed digital image 225 giving information related to an image capture date for the displayed digital image 225. This can assist the user in navigating through the ordered sequence of digital images, particularly when the sequential image display process 125 is advancing the displayed digital image 225 at a fast rate. In the example shown in FIG. 3C, the overlay date text 230 includes the month and the year that the displayed digital image 225 was captured. Alternately, the overlay date text 230 can display the date information in other formats such as "22 Jun. 2009," "Jun. 22, 2009," "Jun. 22, 2009" or "2009." In one embodiment of the present invention, the user can specify a preferred date format from a menu of available options.

Figure 3D:
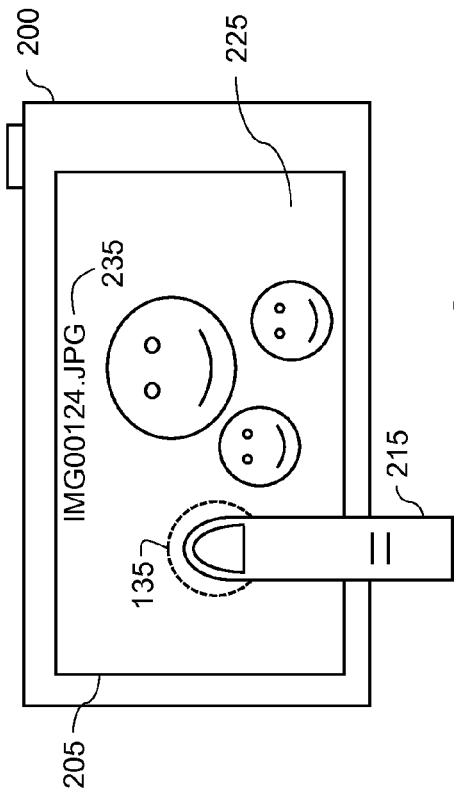
FIG. 3D illustrates a displayed digital image having overlay filename text.

It will be obvious to one skilled in the art that the overlay text can also include other types of information. For example, FIG. 3D shows an example where overlay filename text 235 is included indicating the filename for the displayed digital image 225. Other types of overlay text that can be added would include information identifying the image capture location or the names of persons in the displayed digital image.

Figure 4:
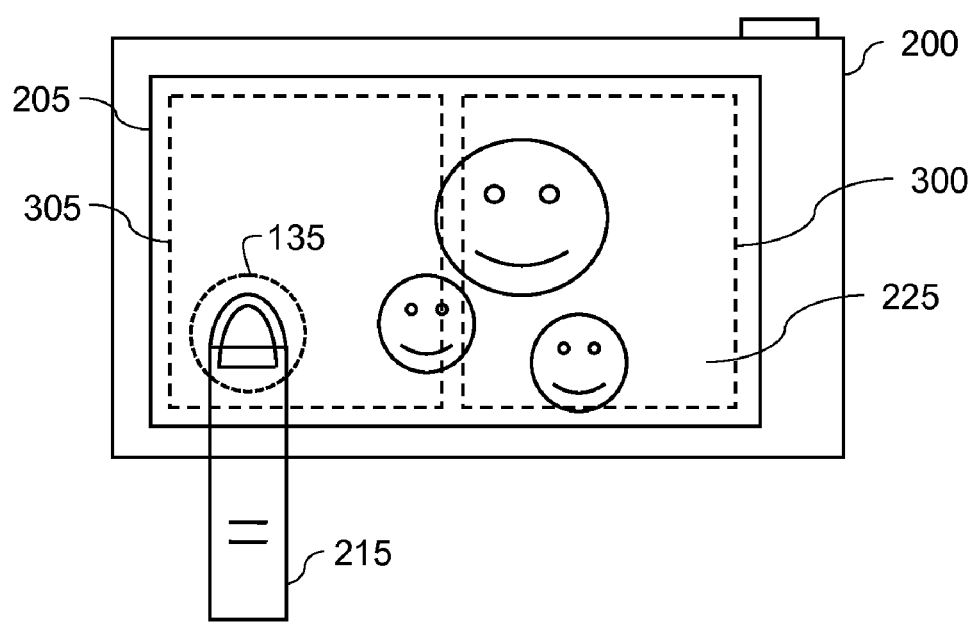
FIG. 4 illustrates a touch display with a scroll forward region and a scroll backward region.

In a preferred embodiment of the present invention, the touch position 135 at which the user touches the touch screen 205 is used to calculate both the scroll rate 145 (FIG. 2) and the scroll direction. As shown in FIG. 4, two regions of the touch screen can be designated corresponding to different scroll directions. When the touch position 135 falls within a scroll forward region 300 corresponding to the right half of the touch screen 205, the sequential image display process 125 scrolls through the ordered sequence of digital images 110 in a forward direction. That is, the next digital image that will be displayed is the following digital image in the ordered sequence of digital images 110. When the touch position 135 falls within a scroll backward region 305 corresponding to the left half of the touch screen 205, the sequential image display process 125 scrolls through the ordered sequence of digital images 110 in a backward direction. That is, the next digital image that will be displayed is the preceding digital image in the ordered sequence of digital images 110. Optionally, a pause region can be defined in the center of the touch screen 205 between the scroll backward region 305 and the scroll forward region 300 where the sequential image display process 125 sets the scroll rate 145 to "zero" and pauses on the current displayed digital image 225.

Figure 5A:
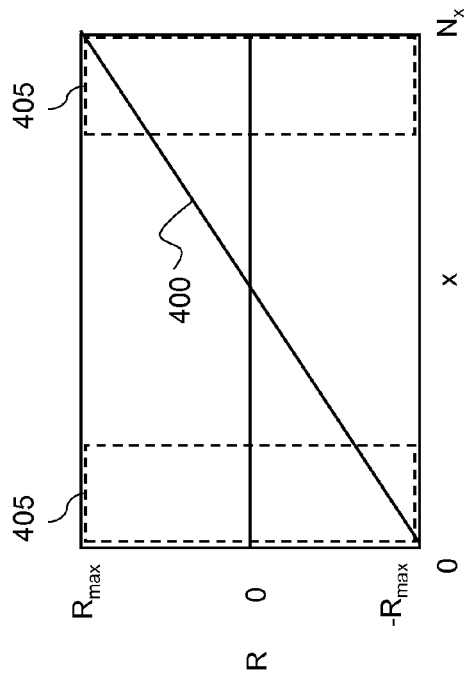
FIG. 5A shows a touch screen with a corresponding coordinate system.

The calculate scroll rate step 140 (FIG. 2) calculates the scroll rate 145 responsive to the touch position 135. The touch position 135 can be conveniently represented by defining a two-dimensional coordinate system corresponding to the horizontal and vertical directions of the display screen. FIG. 5A shows an example of a coordinate system defined relative to the touch screen 205. An "x" coordinate value specifies a position in the horizontal direction, and a "y" coordinate value specifies a position in the vertical direction. In one embodiment of the present invention, there are an integer number of discrete positions that can be sensed providing x-coordinate values between 0 and $N_x$ and y-coordinate values between 0 and $N_y$, where $N_x$ and $N_y$ are the maximum discrete positions that can be sensed in the horizontal and vertical directions, respectively.

Figure 5B:
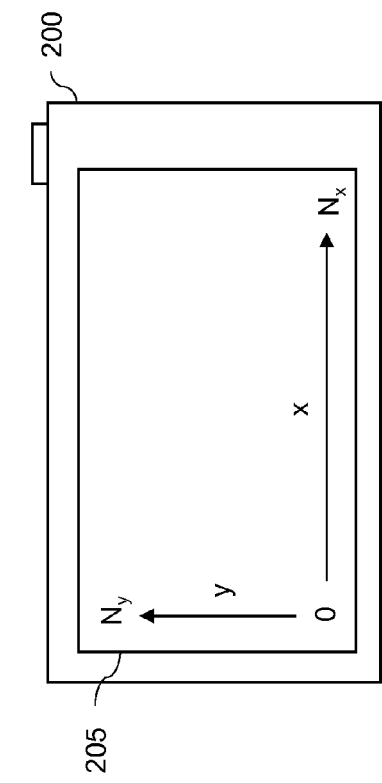
FIG. 5B illustrates a linear scroll rate function.

In a preferred embodiment of the present invention, only the x-coordinate is used to determine the scroll rate. FIG. 5B illustrates a graph showing an example linear scroll rate function 400 that uses a linear relationship to determine the scroll rate as a function of the x-coordinate value. This particular linear scroll rate function 400 can be described using the following equation:

$$R = R_{max}\left(\frac{2x}{N_x} - 1\right) \quad (1)$$

where R is the scroll rate, x is the x-coordinate value of the touch position 135 and $R_{max}$ is a maximum scroll rate. For touch positions 135 on the right half of the touch screen 205, the scroll rate will be positive corresponding to a forward scroll direction. For touch positions 135 on the left half of the touch screen 205, the scroll rate will be negative corresponding to a backward scroll direction. When x=0, corresponding to a touch position 135 at the left edge of the touch screen 205, the scroll rate will be $-R_{max}$. When $x=N_x/2$, corresponding to a touch position 135 in the center of the touch screen 205, the scroll rate will be 0, corresponding to pausing the sequential image display process. When $x=N_x$, corresponding to a touch position 135 at the right edge of the touch screen 205, the scroll rate will be $R_{max}$.

The scroll rate can be related to a time interval T between the display of sequential images using the relationship:

$$T = |1/R| \quad (2)$$

The larger the scroll rate, the smaller the time interval between the display of sequential images. The scroll direction can be determined using the following relationship:

$$\text{Direction} = \begin{cases} \text{Forward;} & R \geq 0 \\ \text{Backward;} & R < 0 \end{cases} \quad (3)$$

As mentioned earlier, it can be helpful to overlay text information showing the image capture date, particularly when the scroll rate is high. Date display regions 405 can be defined specifying ranges of touch positions where the overlay date text 230 is used to overlay the displayed digital image 225. Alternately, a test can be performed on the scroll rate to determine whether or not to display the overlay date text 230:

$$\text{DateDisplay} = \begin{cases} \text{True} & |R| \geq R_T \\ \text{False} & |R| < R_T \end{cases} \quad (3)$$

where DateDisplay is a Boolean variable indicating whether or not the overlay date text 230 should be displayed, and $R_T$ is a scroll rate threshold value.

Figure 5C:
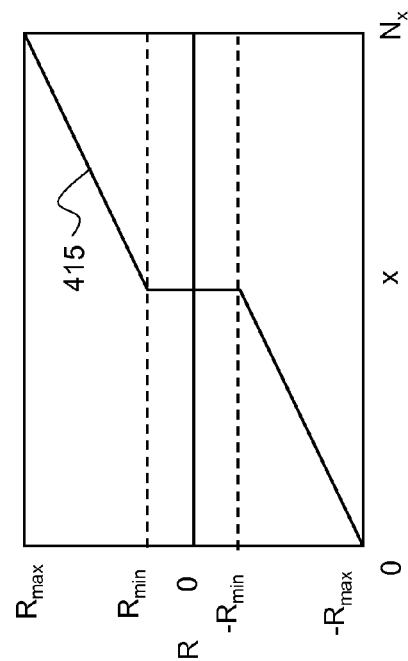
FIG. 5C illustrates a scroll rate function where the rate increases nonlinearly near the borders of the touch screen.
Figure 5D:
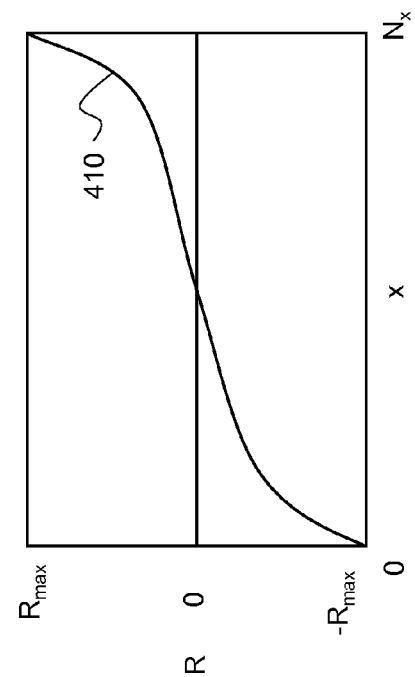
FIG. 5D illustrates a scroll rate function having a minimum scroll rate.

As will be obvious to one skilled in the art, other forms can be used for the scroll rate function besides the linear scroll rate function 400 shown in FIG. 5B. For example, FIG. 5C shows a scroll rate function 410 where the rate increases nonlinearly when the touch position nears either the left or right borders of the touch screen 205. This can be useful when it is desirable to quickly skip over a large number of images to get to jump to another portion of the ordered sequence of digital images 110 (FIG. 2). Similarly, FIG. 5D shows a scroll rate function 415 having a minimum scroll rate $R_{min}$. As the touch position 135 transitions across the center of the touch screen 205, the scroll rate R jumps from the minimum backward scroll rate $-R_{min}$ to the minimum forward scroll rate $R_{min}$.

In the examples just described, the behavior of the sequential image display process 125 is independent of the y-coordinate value of the touch position 135. In an alternate embodiment of the present invention, the sequential image display process 125 only operates when the y-coordinate value of the touch position 135 is within a specified range. For example, a control region could be provided along the bottom edge of the touch screen 205, and an appropriate user interface element could be provided defining the control region. If the touch position 135 falls outside of this region, the sequential image display process 125 would not be initiated.

In alternate embodiments of the present invention the behavior of the sequential image display process 125 is responsive to both the x-coordinate value and the y-coordinate value of the touch position 135. For example, the x-coordinate value can be used to control the scroll rate 145 as described above, and the y-coordinate value can be used to control some other attribute of the sequential image display process 125. For example, the y-coordinate value can be used to control a magnification value for the displayed digital image 225 so that the displayed digital image 225 is magnified to an increasing degree as the touch position 135 is moved to a higher position. Alternately, the y-coordinate value can be used to control some other aspect of the sequential image display process 125, such as whether the overlay date text 230 is displayed, or the transition mode that is used to transition between subsequent images.

Figures 6, 7:
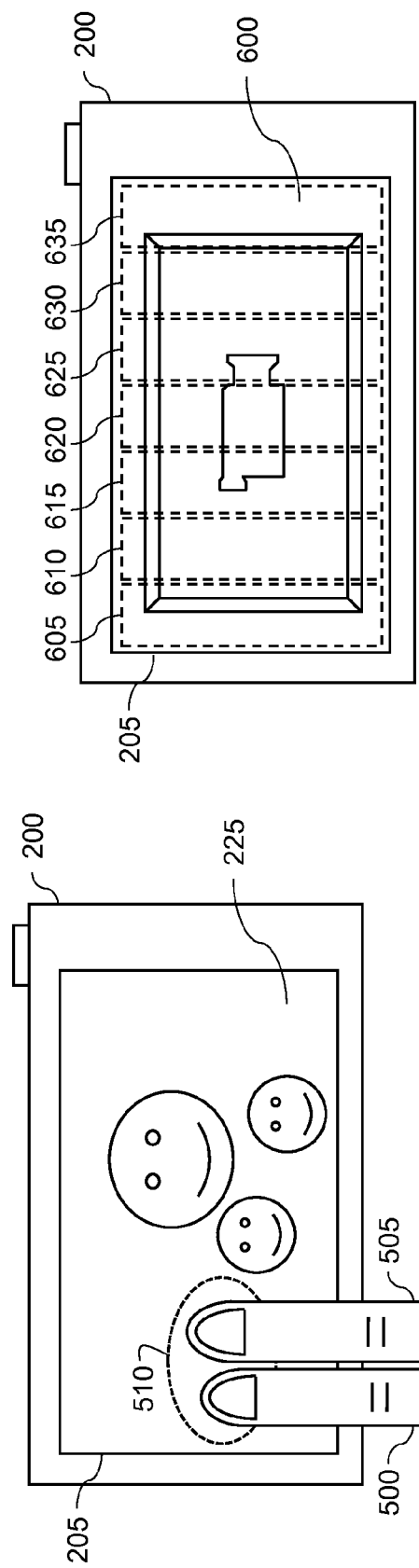
FIG. 6 illustrates a digital camera being used to browse digital images according to an alternate embodiment of the present invention that uses a two-finger touch.
FIG. 7 illustrates a series of regions on a touch screen that can be used to control the playback of a digital video.

In a preferred embodiment of the present invention, the touch position 135 corresponds to the position that a single finger is touching the touch screen 205. In an alternate embodiment of the present invention, the user interface of the digital imaging device implementing the present invention can be programmed to perform different functions depending on whether the touch screen is touched with a single finger touch or a multiple-finger touch. For example, a single-finger touch could initiate an image editing mode, while a two-finger touch could initiate the sequential image display process 125 according to the method of the present invention. FIG. 6 shows an example where a two-finger touch is used to control the sequential image display process 125. In this case, a first finger 500 and a second finger 505 are used to touch the touch screen 205, producing a two-finger touch position 510 which would be used to control the sequential image display process 125.

As has been mentioned previously, the ordered sequence of digital images 110 can correspond to the frames of a digital video. The digital video could be a motion sequence captured by a digital camera capable of being used in a still image mode or a video mode. Alternately, it can be a digital video captured using a digital video camera. In this case, the display screen with the touch screen user interface could be a component of the digital video camera. FIG. 7 shows an alternate configuration that can be used when the present invention is used to browse a displayed digital video 600. In this case, a series of regions are defined corresponding to ranges of touch positions. Each region can correspond to a different play mode. For example, when the touch position 135 is detected to be within a 1× forward display mode region 625, the sequential image display process 125 can display the frames of the digital video with a normal playback speed (i.e., scroll rate). As the touch position 135 moves to the right into a 2× forward display mode region 630 or a 4× forward display mode region 635, the playback speed is adjusted to be 2× or 4× the normal playback speed, respectively. When the touch position 135 is detected to be within a pause mode region 620, the scroll rate is set to zero and the playback of the digital video is paused. Similarly, as the touch position 135 is detected to be within a 4× backward display mode region 605, a 2× backward display mode region 610 or a 1× backward display mode region 615, the digital video is played in a backward direction at playback speeds of 4×, 2× or 1× the normal playback speed, respectively.

In some digital video configurations, key frames can be identified within a digital video sequence. For example, the key frames can correspond to frames sampled at regular intervals, to video frames identified to contain important scene content, or to representative frames within each different "scene" that makes up a video clip. The key frames can be manually user specified, or can be determined using an automatic algorithm. When such key frames have been identified, the sequential image display process 125 can be configured to briefly pause when it encounters one of the key frames.

A similar approach can be used when the ordered sequence of digital images 110 corresponds to a collection of digital still images. In this case, the important digital images can correspond to images that have been identified to be high-value images. For example, many digital cameras allow a user to tag images as "favorites." Alternately, it is well-known to one skilled in the art that automatic algorithms can be used to estimate the aesthetic quality of digital images. Such an algorithm could be used to identify particularly high quality images to be tagged as important images.

The invention has been described in detail with particular reference to certain preferred embodiments thereof, but it will be understood that variations and modifications can be effected within the spirit and scope of the invention.

PARTS LIST 10 light from subject scene
11 imaging stage
12 lens
13 neutral density (ND) filter block
14 iris block
16 brightness sensor block
18 shutter
20 color filter array image sensor
22 analog signal processor
24 analog-to-digital (A/D) converter
26 timing generator
28 image sensor stage
30 bus
32 digital signal processor (DSP) memory
36 digital signal processor (DSP)
38 processing stage
40 exposure controller
50 system controller
52 system controller bus
54 program memory
56 system memory
57 host interface
60 memory card interface
62 memory card socket
64 memory card
68 user interface
70 viewfinder display
72 exposure display
74 user inputs
76 status display
80 video encoder
82 display controller
88 image display
100 digital image collection
105 form ordered sequence step
110 ordered sequence of digital images
115 enter image review mode step
120 initiate touch and hold step
125 sequential image display process
130 monitor touch position step
135 touch position
140 calculate scroll rate step
145 scroll rate
150 terminate touch and hold step
155 terminate sequential image display process step
200 digital camera
205 touch screen
210 first digital image
215 finger
225 displayed digital image
230 overlay date text
235 overlay filename text
300 scroll forward region
305 scroll backward region
400 linear scroll rate function
405 date display regions
410 scroll rate function
415 scroll rate function
500 first finger
505 second finger
510 two-finger touch position
600 displayed digital video
605 4× backward display mode region
610 2× backward display mode region
615 1× backward display mode region
620 pause mode region
625 1× forward display mode region
630 2× forward display mode region
635 4× forward display mode region

The invention claimed is:

1. A method for browsing a collection of digital images on a display screen with a touch screen user interface, comprising:
forming an ordered sequence of digital images including a plurality of distinct digital images from the collection of digital images;
entering an image review mode and displaying a first digital image from the ordered sequence of digital images on the display screen;
initiating a sequential image display process in response to a user touching the touch screen user interface, wherein the sequential image display process sequentially displays digital images in the ordered sequence of digital images on the touch screen user interface until such time that the user stops touching the touch screen user interface, wherein a time interval between the display of sequential images is specified by a scroll rate which is controlled responsive to a position that the user is touching the touch screen user interface; and
overlaying text information on the displayed digital images during the sequential image display process, wherein the text information is only displayed when the scroll rate is greater than a predefined threshold, wherein the text information is overlaid in a fixed position.

2. The method of claim 1 wherein the scroll rate is slower when the user is touching the touch screen user interface toward the center of the touch screen user interface and faster when the user is touching the touch screen user interface towards the edges of the touch screen user interface.

3. The method of claim 1 wherein a direction that the sequential image display process scrolls through the ordered sequence of digital images is responsive to the position that the user is touching the touch screen user interface.

4. The method of claim 3 wherein the sequential image display process scrolls through the ordered sequence of digital images in a forward direction when the user is touching a first side of the touch screen user interface and in a reverse direction when the user is touching a second opposite side of the touch screen user interface.

5. The method of claim 1 wherein the sequential image display process is initiated with a single-finger touch.

6. The method of claim 1 wherein the sequential image display process is initiated with a multiple-finger touch.

7. The method of claim 1 wherein the text information includes information related to an image capture date for the displayed digital image.

8. The method of claim 7 wherein the information related to the image capture date is a month and year that the displayed digital image was captured.

9. The method of claim 1 wherein the text information includes a filename for the displayed digital image.

10. The method of claim 1 wherein the text information includes an image capture location associated with the displayed digital image.

11. The method of claim 1 wherein the text information includes the names of persons in the displayed digital image.

12. The method of claim 1 wherein the scroll rate is adjusted during the sequential image display process by the user adjusting the position that the touch screen user interface is being touched.

13. The method of claim 1 wherein the ordered sequence of digital images corresponds to frames of a digital video.

14. The method of claim 1 wherein the sequential display process pauses when important digital images are displayed.

15. The method of claim 14 wherein the important digital images are digital images that have been tagged by a user to be favorites.

16. The method of claim 14 wherein the important digital images are key frames that have been identified in a digital video.

17. The method of claim 1 wherein the digital images are captured by a digital camera.

18. The method of claim 17 wherein the ordered sequence of digital images is stored in the digital camera, and wherein the display screen with the touch screen user interface is provided on the digital camera.

19. The method of claim 1 wherein the display screen with the touch screen user interface is provided as a component of a digital picture frame.

20. A digital camera system comprising:
an image sensor;
an optical system for forming images of a scene on the image sensor;
a display screen with a touch screen user interface;
a data processing system; and
a memory system communicatively connected to the data processing system and storing instructions configured to cause the data processing system to implement a method for browsing a collection of digital images captured using the image sensor wherein the instructions comprise:
forming an ordered sequence of captured digital images including a plurality of distinct captured digital images from the collection of digital images;
initiating a sequential image display process in response to a user touching the touch screen user interface, wherein the sequential image display process sequentially displays digital images in the ordered sequence of captured digital images on the touch screen user interface until such time that the user stops touching the touch screen user interface, wherein a time interval between the display of sequential images is given by a scroll rate which is controlled responsive to a position that the user is touching the touch screen user interface; and
overlaying text information on the displayed digital images during the sequential image display process, wherein the text information is only displayed when the scroll rate is greater than a predefined threshold, wherein the text information is overlaid in a fixed position.

21. The digital camera system of claim 20 wherein the digital camera system is a digital video camera and the ordered sequence of digital images corresponds to frames of a digital video.

* * * * *